United States Patent [19]

Caccia

[11] 4,348,278
[45] Sep. 7, 1982

[54] SETTLEMENT TANK CONDITION MONITORING SYSTEM

[76] Inventor: Carl Caccia, 72 Empire Ave., Toronto, Ontario, Canada, M4M 2L4

[21] Appl. No.: 202,722

[22] Filed: Oct. 31, 1980

[51] Int. Cl.³ ............................................. B01D 21/00
[52] U.S. Cl. ....................................... 210/86; 210/90
[58] Field of Search .................... 210/86, 90, 104, 114

[56] References Cited

U.S. PATENT DOCUMENTS

| | | | |
|---|---|---|---|
| 3,443,692 | 3/1969 | Halsey | 210/114 X |
| 3,939,072 | 2/1976 | La Forte | 210/104 |
| 3,983,031 | 9/1976 | Kirk | 210/104 X |
| 4,226,714 | 10/1980 | Furness et al. | 210/104 |

*Primary Examiner*—John Adee

[57] ABSTRACT

A settlement tank wherein suspended solids or denser fluids are separated from a lighter parent liquid by gravitational settlement is provided with a monitoring arrangement to permit determination of the prevailing distribution of suspended matter, including that depth of the lighter liquid at which an interface may exist with settled material of greater density, to permit selective removal of one of the fluids from the tank, for utilization or disposal. The monitoring arrangement comprises a probe displaceably mounted for movement downward through the liquid having detection means for sensing the instantaneous hydrostatic pressure acting on the head of the probe. One embodiment utilizes a display wherein the variation in density is evidenced as a change in the gradient of a pressure depth and/or pressure time characteristic. The provision of depth monitoring means for the probe head permits the provision of a subtractive feed back to compensate for the static head of the parent fluid, which by subtraction from the sensor head output provides a differential output responsive solely to variation in sensed pressure due to the presence of settling suspended matter creating a density change of the tank contents at the level being sensed.

4 Claims, 6 Drawing Figures

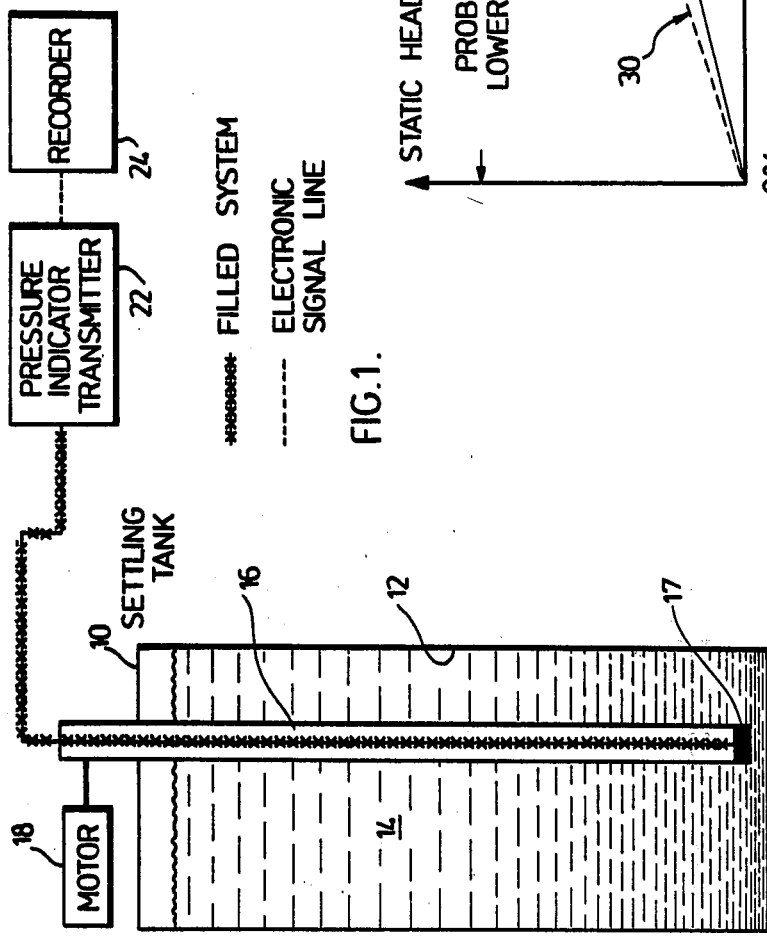

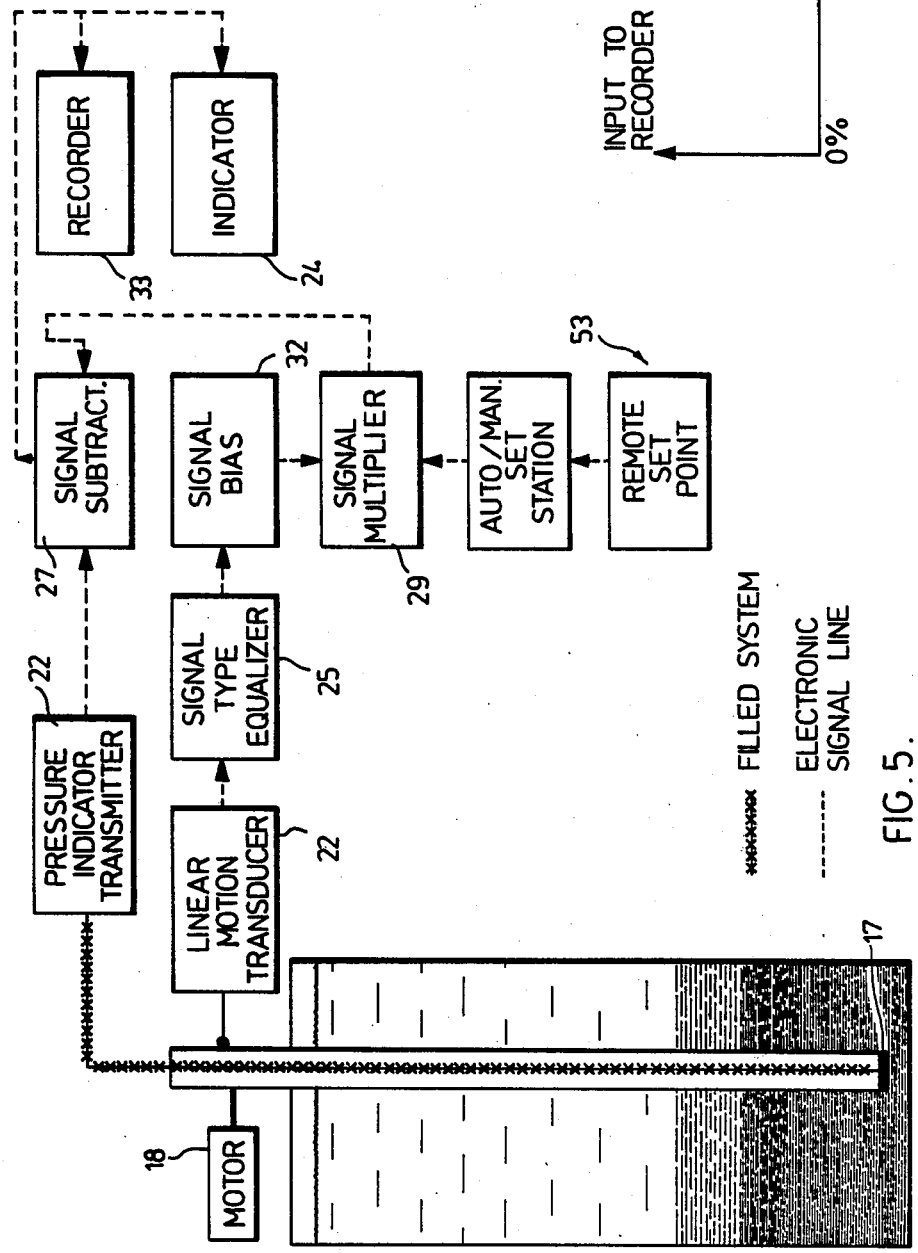

SETTLEMENT TANK CONDITION MONITORING SYSTEM

BACKGROUND OF THE INVENTION

This invention is directed to a system for the gravitational separation of fluids, and to a particular arrangement for determining the current condition of settlement of suspended matter, including sensing the location of any inter-face present in a settlement tank between substances of significantly differing densities, including at least one fluid.

The separation of mechanical mixtures of material suspended in a fluid or in a mixture of fluids, plays an important part in a number of processes, both in industry and society, ranging from the separation of mining slime fluids to the separation of sludge from water in sewage farms.

In many primary ore extraction industries gravitational separation in settling tanks plays a significant part in the total process. Ore slime slurry for instance must be separated from the parent fluid by way of decanting from within the settlement tank before the leaching process can be initiated. Similarly in other well known and widely used processes it is important to be able to effect gravitational separation of predetermined constituents from a finely divided mixture.

It will be understood that the need for gravitational separation arises from the mechanical mixing of two mutually chemically inert substances comprising at least one liquid, having significantly different densities.

The capital costs of settlement tanks are such that any improvement in the utilization of such tanks by effective reduction of residence time within the tank to effect settling can have significant economic benefits.

It will be understood that such mixtures may include liquids and finely divided solids, which can be considered under certain conditions as 'fluids.'

Attempts have been made in the past to monitor the constituency of the parent fluid, from which the more dense other component is settling. Thus, ultrasonic and radio-active generators operating through ports in the walls of the tank at predetermined levels are known. Also, probes of the on-off type to determine variations in electrical resistivity or specific heat transference rates have been considered, with no known market effect.

OBJECTS OF THE INVENTION

An object of the invention is the provision of a simple low cost system for assessing the current settlement condition, or rate, including the possibility of locating an interface in a settling tank, or determining the volume of solid present.

A further object is to provide a system wherein static liquid head affect attributable to the lower density liquid is automatically compensated.

SUMMARY OF THE INVENTION

The present system, for use in a settling tank, provides a positionable probe for insertion downwardly into the quiescent tank contents, having provision to sense the instantaneous static pressure head operating at the probe face.

The static head at any level comprises a partial pressure due to the head of parent liquid thereabove, plus a pressure component due to the head effect caused by the presence of suspended settling particles of the denser material. Thus, by plotting variation in the total static head against the depth of insertion of the probe, a change in gradient due to an increased concentration of the denser substance as a consequence of settlement taking place makes itself evident as a change in the gradient of the characteristic graph thus obtained. The derivation of a subtractive component representing the pressure head of the parent fluid results in a characteristic wherein density due to the presence of the denser material increases, generally non-linearly, with the increase in submergence of the probe head. This predetermined subtractive component for the static head of the parent fluid can be generated by the use of a feedback circuit responsive to a potentiometer activated by the probe positioning device to provide a subtractive output proportional to the extent of probe immersion. As the probe is immersed deeper, so a linearly increasing signal proportional to probe depth and the density of the suspension liquid is fed in subtractive relation to the output of the probe sensing head.

The use of a pressure sensing transducer attached to the probe head is an embodiment which lends itself to low cost electronic detection circuitry. Alternatively, a probe having a bubbling head may be utilized wherein a fluid such as air is bubbled out of the lower end of the probe, the back pressure thereof, at very low flows representing quite accurately the static head against which the bubbles flow. By driving the bubbler sensing probe progressively downwardly into the tank or withdrawing it from the tank, while maintaining a substantially constant purge flow of bubbles, and monitoring the variation in static head pressure being sensed by the probe head, a characteristic pressure head curve for the tank contents at that time can be obtained indicative of the settlement condition in the tank. The depth at which a significant change in gradient may occur fairly readily indicates at the time of testing the depth at which a settlement interface is located. This permits the selective pumping out of a substantial portion of the heavier or the lighter fraction of the tank contents, to a predetermined value, while optimizing the utilization rate of the settling tank, by assessing the instantaneous condition, thus monitoring the settlement rate and minimizing delay in assessing the condition of tank contents for subsequent pumping or dumping.

It will be understood that the subject system permits the monitoring of tank conditions both for batch settlement and also for continuing input. In addition to making provision for static head compression in the circuit, provision for temperature variation compensation also is contemplated.

DESCRIPTION OF THE DRAWINGS

Certain embodiments of the invention are described, reference being made to the accompanying drawings, wherein;

FIG. 1 is a schematic arrangement of a system incorporating a transducer or pneumatic sensing head and an associated circuit;

FIG. 2 is a graphic representation of pressure variation with depth of immersion for two different conditions of settlement in the tank;

FIG. 5 is an alternative circuit arrangements from that of FIG. 4 including electronic bias components, and remote control, and FIG. 6 is a graphic representation indicative of the amount of solid material settled at the completion of separation.

DESCRIPTION OF THE EMBODIMENTS

Figure 3:
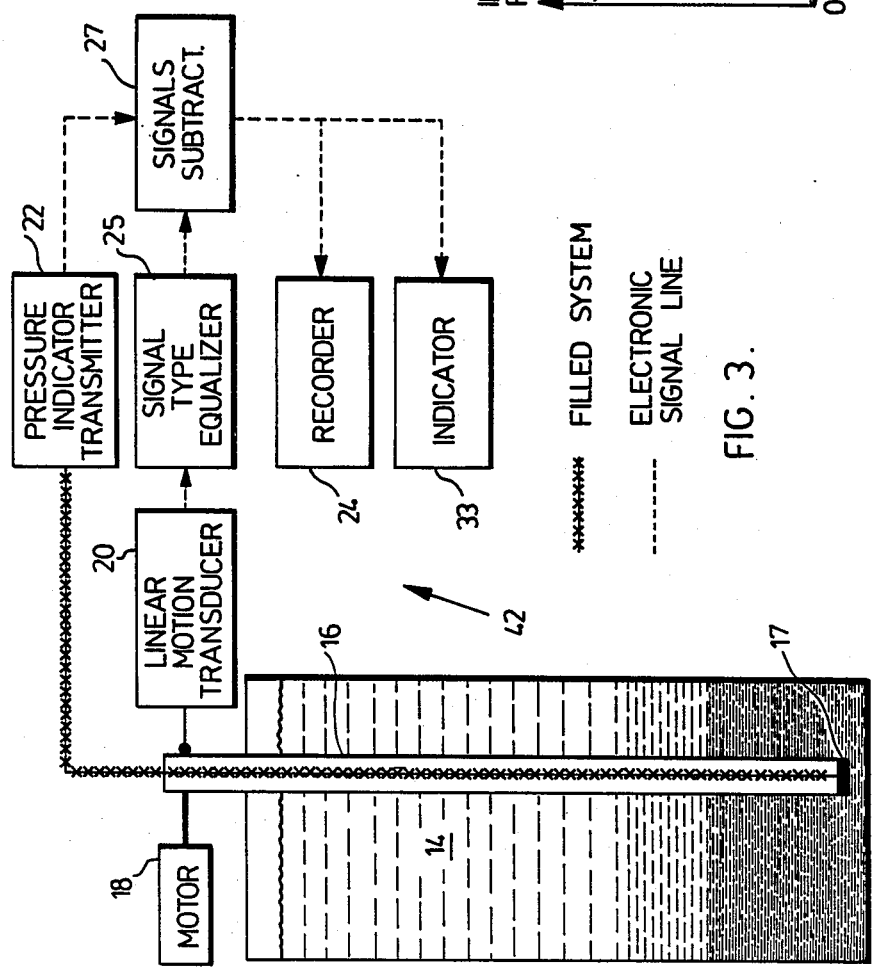
FIG. 3 is a schematic arrangement of a system incorporating subtractive feed back for the pressure head of the parent liquid.

FIG. 1 shows a system 10 having a settling tank 12 wherein a mixed fluid 14 has been introduced for gravitational settlement. A withdrawable probe 16 having a sensing head 17, is shown in fully inserted condition having a positioning drive motor 18 for insertion and retraction of the probe 16 in tank 12.

The sensing head 17 is connected to a pressure indicating transmitter 22, the output which connects with a pressure recorder 24 being generally of the type having a chart.

A pressure recorder 24 is connected with a pressure transmitter to give a read out of the pressure head read by the sensing head 17.

Referring to FIG. 2, this shows a symmetrical pressure diagram wherein the characteristic curve 30 shows a pressure increasing from zero at the surface of the liquid to a maximum value at the lowermost point of insertion probe 17 into the tank 12, and diminishing substantially symmetrically as the probe 17 is withdrawn. Curve 31, taken after a lapse of time shows that more particles have settled during the period intervening between the taking of the two sets of readings.

It will be noted that the non-linear shape of the characteristic curve indicates a non-uniform density of fluid in the tank 12. In the case of homogeneous liquid only being present in tank 12, the characteristic curve would be straight line, forming an isosceles triangle in the illustrated arrangement.

Turning to FIG. 3, this system 42, having similar elements similarly numbered, connects the output from the linear transducer 20 corresponding to probe displacement, to a converter 25 wherein the value for probe 17 insertion is converted by the function representing the density of the parent fluid, to provide a static head output in terms of the parent fluid (the lighter density fluid).

This equivalent head value is fed to a subtractor 27 which also receives the static head output from the probe head 17, and from which static head value the equivalent head value for the parent fluid is subtracted. The resultant output, representing that portion of the static head pressure due to increase in density of the fluid, is connected with the pressure recorder 24, which is driven by a synchronous motor to activate the recorder drive and thus provide y-axis displacement for the characteristic curve.

A read-out is also given by a 0-100% graduated pressure indicator 33.

Figure 4:
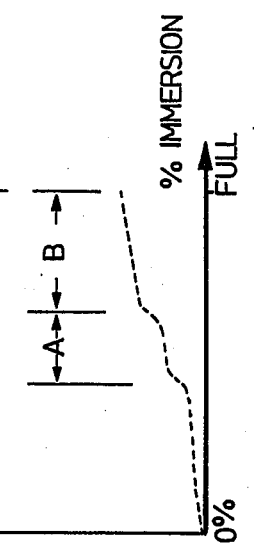
FIG. 4 is a graphic representation of pressure variation with probe depth immersion for the FIG. 3 embodiment.

Turning to FIG. 4, this shows a characteristic curve similar to that of FIG. 2, wherein the effect on static pressure head sensed by the probe 17 is corrected by subtracting that head component due to the parent fluid per se. The marked changes in gradient of the characteristic curve ocurring at depths A and B indicate the presence of interfaces at the respective depths.

Thus, the portions of the characteristic curve having a gradient other than zero is caused by an increase in density, with the significant "bump" being attributed to a fluid interface where a significantly denser fluid exists. The depth of this occurence is readily read from the chart and/or from a graduated 0-100% pressure indicator.

Turning to the FIG. 5 embodiment, there is shown a pressure indicating transmitter 22, the output of which, representing probe static head, is connected with a subtractor 27. The output of transducer 20 is connected with a converter 25 to provide linear output as equivalent static head for the parent fluid.

The output from converter 25 connects to a bias unit 32 wherein the effective value of parent fluid head can be modified, to compensate for a change in filling level in the tank. In effect the parent fluid head value is increased or decreased, according to the level in the tank, without change in the gradient of the head characteristic.

A further correction factor is provided by multiplier to which the output of bias unit 32 is connected.

The multiplier receives an input from a set point 53, having a remote or a manual input, to permit correction for either density of the parent fluid, or variation in the temperature thereof, each of which changes produce change in the gradient of the parent fluid characteristic. The corrected parent fluid equivalent head as the output of multiplier 29, is connected to the subtractor 27, to provide outputs for the pressure recorder 33 and the pressure indicator 24.

FIG. 6 shows the graph plotted when settlement is complete. Note the flattening out that indicates no solid in suspension, or a negligible amount. The graph area is representative of the amount of solid settled.

While the use of a vertically driven probe 16 presents many advantages, because of the often-restricted nature of such settling tanks due to the presence of other apparatus, the orientation of the probe 16 is generally speaking immaterial, so far as reading accuracy is concerned and it may be canted at an angle, or even repositioned by tilting at a changing angle, instead of by axial advance. However, the vertical orientation minimises the stirring effect on the tank contents.

The adoption of a bubbler type instrument having a purge flow controller to provide a constant rate air through-put, together with a back-pressure indicator providing a static head output is comtemplated.

Instead of releasing bubbles into the tank, the bubbler generally utilizes the probe pipe, or a portion of the cross section thereof, as a vent pipe to atmosphere, with no disturbence to the liquid.

The present invention thus provides a system providing a rugged, easily installed apparatus having no internal moving parts, intrinsically safe.

What I claim by Letters Patent of the United States is:

1. A condition monitoring system for use with a settling tank used to receive a mixture of substances including a parent fluid for differential gravitational settlement, said system including; a selectively submersible probe; motor driven means to change the level of the probe end within the tank; continuously operable probe submergence sensing means including a transducer having a static head output signal responsive to the position of said probe end; pressure sensitive head detection means having an output signal responsive to the instantaneous total fluid pressure of said mixture at said probe end; signal conversion means connected to said submergence sensing means having an output equivalent to the partial pressure static head of said parent fluid acting at said probe end, signal subtractor means connected to said conversion means and said head detection means having an output signal responsive to the difference between said total pressure and said partial pressure, and recording means
  for recording said difference signal as a characteristic curve of said tank contents.

2. The system as claimed in claim 1, including percentage graduated pressure indicator means to provide an instantaneous read-out of pressure difference at said probe end due to the concentration of settling substances thereat.

3. The system as claimed in claim 1, said pressure sensitive head detection means including a pressure responsive transducer positioned adjacent said probe end.

4. The system as claimed in claim 1, said pressure sensitive head detection means including gas bubble means for the passage of air bubbles through said probe against the back pressure of contents of said tank acting at said probe end.

* * * * *